Sept. 3, 1935.   F. LA FLAMME   2,013,158
FERTILIZER SPREADER
Filed Sept. 20, 1934   2 Sheets-Sheet 1

Inventor
Frank La Flamme
By Clarence A. O'Brien
Attorney

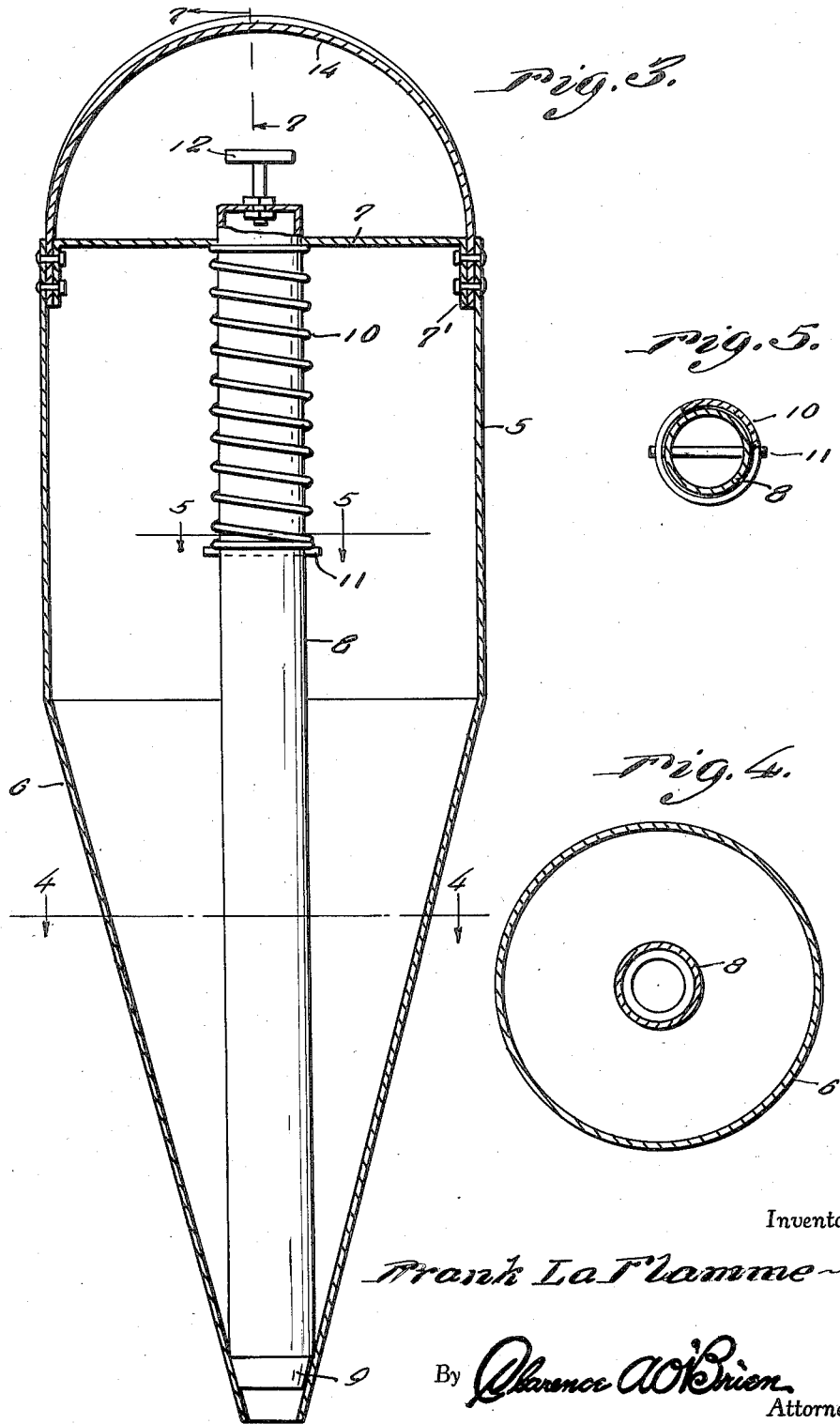

Patented Sept. 3, 1935

2,013,158

UNITED STATES PATENT OFFICE 2,013,158

FERTILIZER SPREADER

Frank La Flamme, East Tawas, Mich.

Application September 20, 1934, Serial No. 744,851

1 Claim. (Cl. 221—119)

The present invention relates to a device for spreading fertilizer around growing plants, in holes or in drills before the seeds are sown.

The object of the invention resides in the provision of a device of this nature which is exceedingly simple in its construction, inexpensive to manufacture, light, easy to carry about and manipulate, convenient, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawing:

Figure 3 is a vertical section taken substantially on the line 3—3 of Figure 1.

Figure 4 is a horizontal section taken substantially on the line 4—4 of Figure 3.

Figure 5 is a detail sectional view taken substantially on the line 5—5 of Figure 3.

Figure 1:
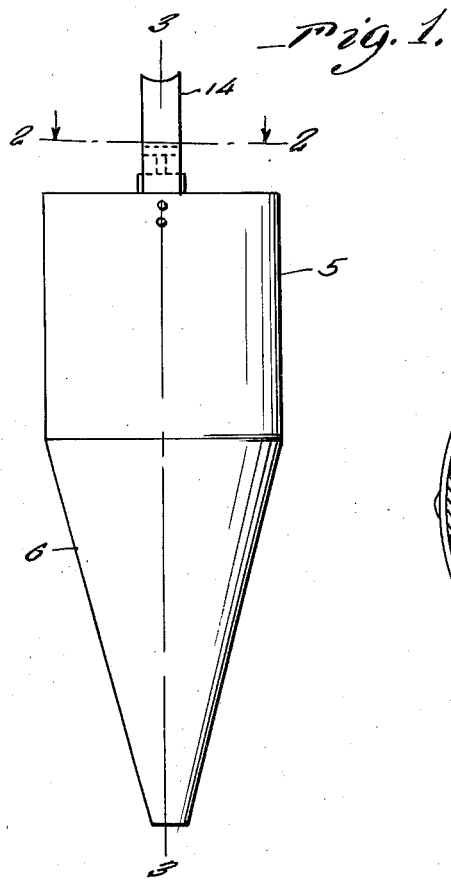
Figure 1 is a side elevation of a device embodying the features of my invention.
Figure 2:
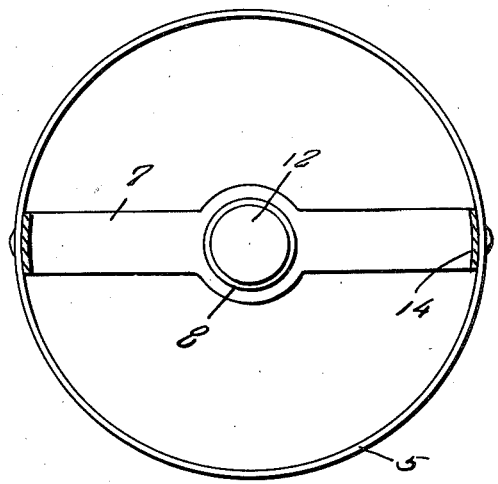
Figure 2 is a sectional view taken substantially on the line 2—2 of Figure 1.
Figure 6:
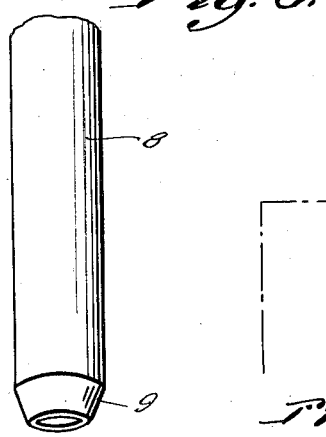
Figure 6 is a perspective view of the lower end of the valve.

Referring to the drawing in detail it will be seen that the body of the device in the form of a container is made up of an upper cylindrical portion 5 the lower end of which merges into an inverted frusto-conical portion 6. A relatively narrow plate 7 extends across the upper end of the portion 5 and has a central opening through which is slidable a hollow elongated tubular valve 8 the lower end of which merges into an inverted frusto-conical shaped terminal 9 for closing the lower end of the frusto-conical portion 6. The terminal 9 has the same slope as the walls of the inverted frusto-conical portion so as to close the open frustum in the bottom portion of the container. This elongated tubular valve member is normally held closed by means of a coil spring 10 disposed about the upper portion thereof and impinging against the plate 7 and against a pin 11 extending through an intermediate portion of the valve 8. A T-shaped handle 12 is engaged in the upper end of the valve 8 so that said valve may be lifted against the tension of the spring to an open position.

Figure 7:
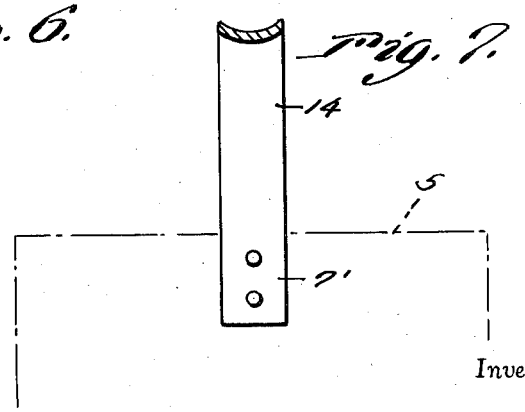
Figure 7 is a detail sectional view taken substantially on the line 7—7 of Figure 3.

An arcuate handle 14 has its ends bolted between ears 7' on the ends of the plate 7 and the upper end portion of the cylindrical portion 5 of the body or container. The handle is curved in cross section as shown in Figure 7 so as to be comfortable when in use. Obviously the fertilizer is placed in the body and the device is carried about by the handle 14 and when it is desired to spread the fertilizer then the handle 12 is lifted so as to open the valve and allow the fertilizer to pour out through the opening in the bottom of the portion 6.

It is thought that the construction, operation, utility and advantages of this invention will now be quite apparent to those skilled in this art without a more detailed description thereof.

The present embodiment of the invention has been described in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A fertilizer spreader of the class described comprising a container provided with an open-mouthed cylindrical portion merging into a depending inverted frusto-conical portion open at the frustum, a plate formed with a central opening in alignment with the open frustum bridging the mouth of the cylindrical portion and formed with depending ears on the ends thereof, an arcuate handle rising above the plate and having the ends thereof disposed between the ears and the cylindrical portion of the container, said ears and ends of the handle secured to the upper portion of the cylindrical portion by common fastening means, an elongated tubular valve co-extensive with the casing and projecting through and guided by the opening in the plate, said valve formed with an inverted frusto-conical terminal, a handle on the free upper end of the valve disposed between the plate and the arcuate handle, a coil spring embracing a portion of the valve and bearing against the bottom of the plate at its upper end, and the lower end of the spring bearing against a projection carried by the valve whereby the inverted frusto-conical terminal is normally seated under tension in the lower end of the frusto-conical portion for controlling the opening therein.

FRANK LA FLAMME.